US012165174B2

(12) United States Patent
Gaither

(10) Patent No.: US 12,165,174 B2
(45) Date of Patent: *Dec. 10, 2024

(54) SYSTEMS AND METHODS FOR DYNAMIC ROAD SIGN PERSONALIZATION

(71) Applicant: TOYOTA MOTOR ENGINEERING & MANUFACTURING NORTH AMERICA, INC., Plano, TX (US)

(72) Inventor: Geoffrey D. Gaither, Plano, TX (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 216 days.

This patent is subject to a terminal disclaimer.

(21) Appl. No.: 17/404,962

(22) Filed: Aug. 17, 2021

(65) Prior Publication Data

US 2021/0374805 A1  Dec. 2, 2021

Related U.S. Application Data

(62) Division of application No. 15/730,530, filed on Oct. 11, 2017, now Pat. No. 11,113,727.

(51) Int. Cl.
*G06Q 30/00* (2023.01)
*G06Q 30/0251* (2023.01)
*G06Q 30/0272* (2023.01)

(52) U.S. Cl.
CPC ..... *G06Q 30/0266* (2013.01); *G06Q 30/0261* (2013.01); *G06Q 30/0272* (2013.01); *B60W 2556/45* (2020.02)

(58) Field of Classification Search
CPC .................................. G06Q 30/0207–30/0277
(Continued)

(56) References Cited

U.S. PATENT DOCUMENTS 4,573,049 A * 2/1986 Obeck ..................... G08G 1/087
340/12.5
5,337,082 A * 8/1994 Fredericks ............... G01S 13/91
342/114

(Continued)

FOREIGN PATENT DOCUMENTS

JP    2011209235 A * 10/2011 ............. G01C 21/26
JP    2013139685 A *  7/2013 ............. E01F 9/016
JP    2015133089 A *  7/2015 ............. G08G 1/16

OTHER PUBLICATIONS

Wachtel, Jerry. Safety Impacts of the Emerging Digital Display Technology for Outdoor Advertising Signs Final Report (Apr. 2009). Retrieved online Jan. 28, 2021. http://www.dutchessny.gov/Departments/Planning/docs/NCHRP-Safety-Impacts-of-the-Emerging-Digital-Display-Technology.pdf (Year: 2009).*

(Continued)

*Primary Examiner* — James A Reagan
(74) *Attorney, Agent, or Firm* — SHEPPARD, MULLIN, RICHTER & HAMPTON LLP; Daniel N. Yannuzzi

(57) ABSTRACT

Systems and methods are provided for presenting personalized information to one or more vehicle occupants as a vehicle approaches and/or passes a road sign. Characteristics of a vehicle, e.g., operating conditions, characteristics of the one or more vehicle occupants, e.g., age, demographic, driving record, purchase history, etc. and/or road conditions, e.g., weather-related road conditions, current traffic conditions, etc., may be obtained. Information relevant to the one or more vehicle occupants based on one or more of these characteristics/conditions may presented to the one or more vehicle occupants. In scenarios where the presentation of personalized information is unwanted/unwarranted, more generalized information and/or safety warnings or recommendations can be presented.

24 Claims, 6 Drawing Sheets

(58) Field of Classification Search
USPC .............................................. 705/14.1–14.73
See application file for complete search history.

(56) References Cited

U.S. PATENT DOCUMENTS

| | | | | |
|---|---|---|---|---|
| 9,082,134 | B2* | 7/2015 | Gishen | G06Q 30/0261 |
| 9,087,465 | B2* | 7/2015 | Griffin | G09F 27/00 |
| 9,183,572 | B2* | 11/2015 | Brubaker | G06Q 30/02 |
| 9,262,775 | B2* | 2/2016 | Lamont | H04W 4/80 |
| 9,451,020 | B2* | 9/2016 | Liu | H04L 43/0811 |
| 9,809,184 | B2* | 11/2017 | Smith | G07C 5/008 |
| 10,083,604 | B2* | 9/2018 | Ricci | G08G 1/0145 |
| 10,740,796 | B2* | 8/2020 | Brubaker | G08G 1/0965 |
| 10,957,190 | B2* | 3/2021 | Bronk | G08G 1/096741 |
| 2003/0046162 | A1* | 3/2003 | Nestel | G06Q 30/02 |
| | | | | 705/14.66 |
| 2006/0229939 | A1* | 10/2006 | Bhakta | G06Q 30/0265 |
| | | | | 705/14.62 |
| 2008/0262909 | A1* | 10/2008 | Li | G06Q 30/0272 |
| | | | | 702/1 |
| 2009/0299857 | A1* | 12/2009 | Brubaker | G06Q 30/02 |
| | | | | 705/14.66 |
| 2012/0054028 | A1* | 3/2012 | Tengler | G01C 21/3697 |
| | | | | 705/14.49 |
| 2012/0303203 | A1* | 11/2012 | Olsen | G08G 1/0133 |
| | | | | 701/423 |
| 2014/0257949 | A1* | 9/2014 | Gishen | G06Q 30/0252 |
| | | | | 705/14.5 |
| 2015/0193826 | A1* | 7/2015 | Canoy | G06Q 30/0269 |
| | | | | 705/14.66 |
| 2015/0317687 | A1* | 11/2015 | Ramesh | G06Q 30/0269 |
| | | | | 705/14.66 |
| 2015/0363828 | A1* | 12/2015 | Mantalovos | G08G 1/0141 |
| | | | | 705/14.58 |
| 2016/0021178 | A1* | 1/2016 | Liu | H04L 41/06 |
| | | | | 370/216 |
| 2016/0066012 | A1* | 3/2016 | Friedlander | G06F 16/285 |
| | | | | 725/34 |
| 2016/0140614 | A1* | 5/2016 | Brubaker | G06Q 30/0266 |
| | | | | 705/14.62 |
| 2016/0210660 | A1* | 7/2016 | Flynn | H04W 4/23 |
| 2016/0292713 | A1* | 10/2016 | Chen | G06Q 30/0242 |
| 2017/0129426 | A1* | 5/2017 | Smith | B60R 16/037 |
| 2017/0200197 | A1* | 7/2017 | Brubaker | B60Q 1/5037 |
| 2017/0345113 | A1* | 11/2017 | Kar | G06Q 30/0267 |
| 2018/0018702 | A1* | 1/2018 | Gibson | G06Q 30/0266 |
| 2018/0053215 | A1* | 2/2018 | e Costa | H04W 4/44 |
| 2018/0075481 | A1* | 3/2018 | Adoni | G06F 16/285 |
| 2018/0114251 | A1* | 4/2018 | Zavesky | G06Q 30/0265 |
| 2018/0129204 | A1* | 5/2018 | Ricci | B60W 30/16 |
| 2018/0130347 | A1* | 5/2018 | Ricci | G08G 1/096775 |
| 2018/0232770 | A1* | 8/2018 | Miller | G06Q 30/0242 |
| 2021/0133811 | A1* | 5/2021 | Gibson | G06Q 30/0269 |

OTHER PUBLICATIONS

Jingwen Feng. Traffic Sign Detection and Recognition System for Intelligent Vehicles. (2014). Retrieved online Apr. 20, 2021. https://ruor.uottawa.ca/bitstream/10393/31449/1/Feng_Jingwen_2014_thesis.pdf (Year: 2014).*

* cited by examiner

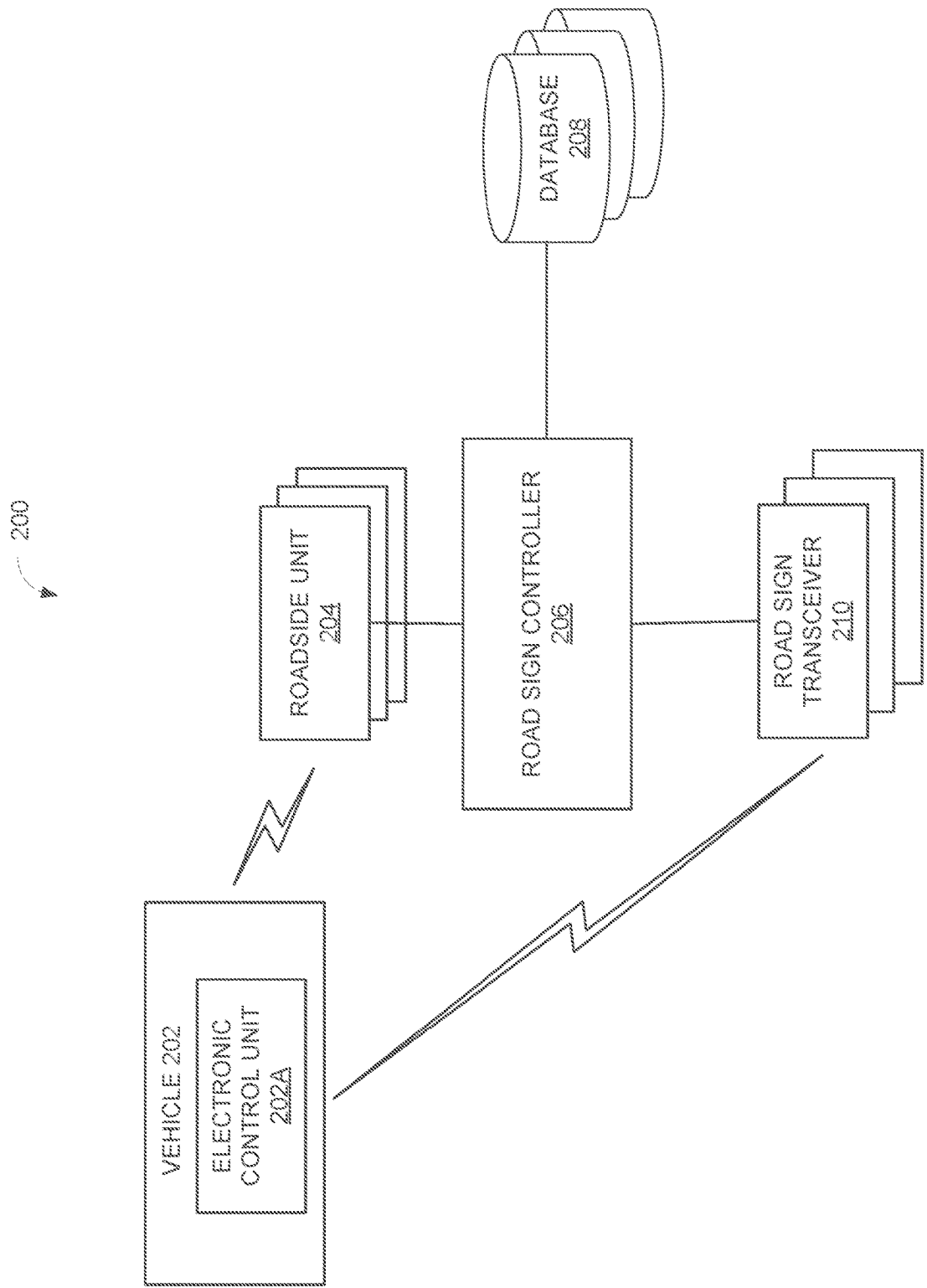

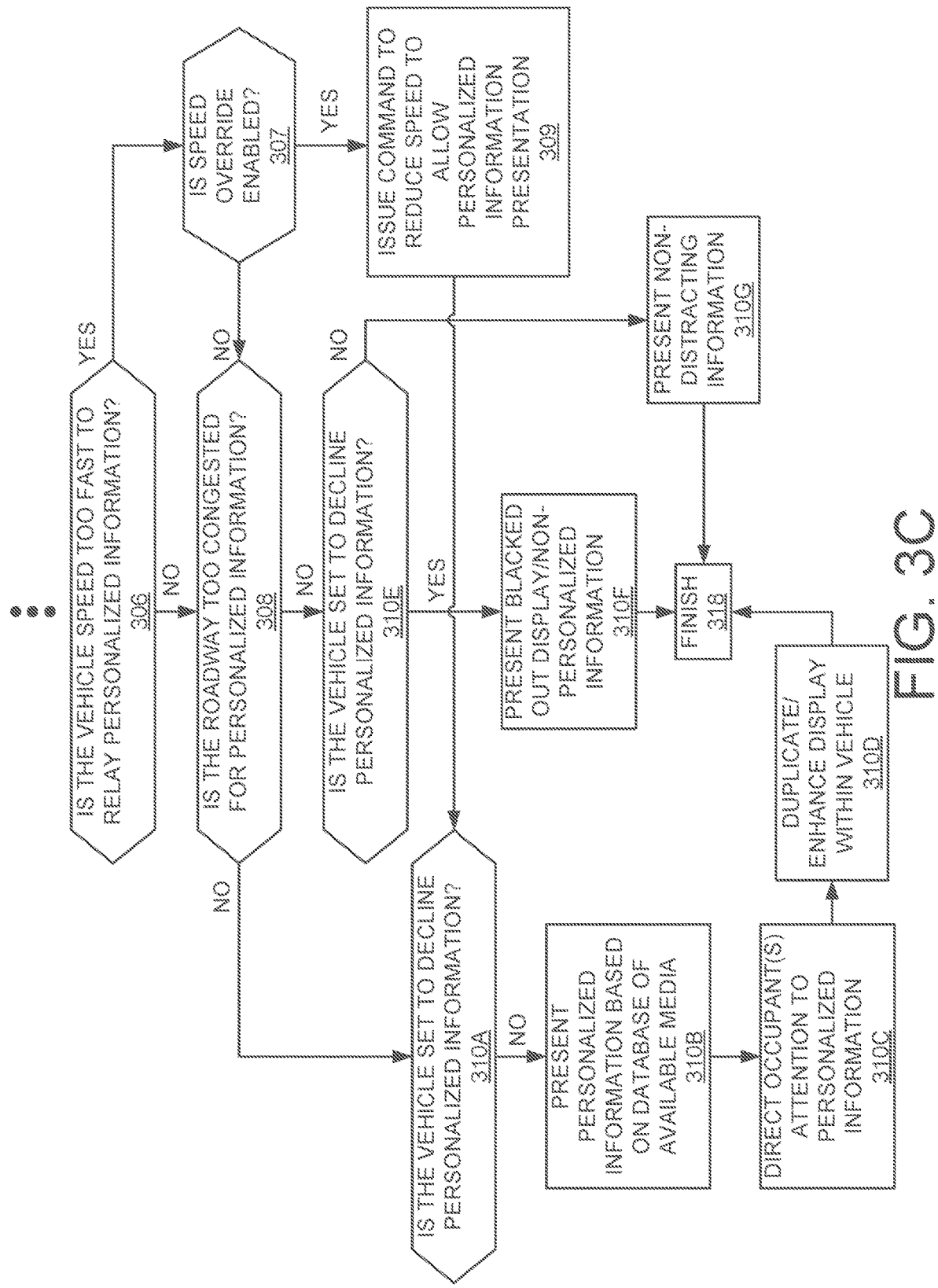

SYSTEMS AND METHODS FOR DYNAMIC ROAD SIGN PERSONALIZATION

CROSS REFERENCE TO RELATED APPLICATIONS

This application is a divisional application of U.S. application Ser. No. 15/730,530 filed Oct. 11, 2017, which is incorporated by reference in its entirety.

TECHNICAL FIELD

The present disclosure relates generally to personalizing content displayed on a road sign, such as a billboard. In particular, some embodiments are directed to obtaining operating characteristics of one or more vehicles and/or characteristics of one or more occupants of those vehicles proximate to a road sign. Based on those characteristics, information, such as targeted advertising, public service announcements, safety warnings, and the like may be displayed on the road sign.

DESCRIPTION OF RELATED ART

Conventional billboards or road signs are static in that they present information that does not change or adapt to vehicles proximate to the billboards or road signs nor to viewers of the information. For example, a billboard may have an advertisement painted onto the billboard surface that cannot be changed unless or until another advertisement is painted onto the billboard surface. In the case of digital billboards, digital media, such as a pre-programmed set of images may be displayed in a repetitive loop. These digital images do not change unless the billboard is re-programmed to display other digital media.

BRIEF SUMMARY OF THE DISCLOSURE

In accordance with one embodiment, a method comprises detecting proximity of a vehicle to a road sign, and obtaining data regarding at least one of operating characteristics of the vehicle and characteristics of one or more occupants of the vehicle. Moreover, current traffic conditions proximate to the road sign may be determined. Upon a determination that personalized information should not be presented via the road sign based on the current traffic conditions, generalized information may be presented on the road sign. Upon a determination that personalized information should be presented via the road sign, the personalized information may be presented on the road sign.

In some embodiments, obtaining data regarding the operating characteristics of the vehicle comprise communicating with the at least one of an electronic control unit and one or more sensors of the vehicle. Communication may occur over a vehicle-to-infrastructure communications channel to obtain the operating characteristics of the vehicle. In some embodiments, the operating characteristics of the vehicle comprise at least one of vehicle speed, vehicle acceleration, travel origin, travel destination, lane change history, and continuous operation time.

In some embodiments, obtaining data regarding characteristics of one or more occupants of the vehicle comprises receiving at least one of biometric sensor signals from biometric sensors associated with the vehicle. Additionally, obtaining data can comprise obtaining vehicle associated account information regarding the one or more occupants of the vehicle. In some embodiments, obtaining data can comprise obtaining information suggestive of at least one of the one or more occupants' travel preferences, travel history, purchase preferences, purchase history, and demographic information associated with the one or more occupants.

The current traffic conditions upon which the determination that personalized information should not be presented may comprise traffic conditions that result in non-intended recipients of the personalized information receiving the personalized information. The generalized information may be based upon at least one of operating characteristics of a group of vehicles proximate to the road sign, common characteristics of one or more occupants of each vehicle in the group of vehicles, and road conditions data applicable to the group of vehicles.

The method may further comprise, prior to presenting the personalized information on the road side, determining to present the personalized information on another road sign. This determination can be made based upon a change in at least one of visibility of the road sign, speed of travel of the vehicle, direction of travel of the vehicle, and lane change.

In accordance with another embodiment, a method comprises detecting proximity of a vehicle to a digital billboard, obtaining operating characteristics of the vehicle, and obtaining characteristics of at least one occupant of the vehicle. At least a current speed of travel of the vehicle can be determined. An estimate can be made whether first, targeted media for presentation on the digital billboard selected based upon the operating characteristics of the vehicle could be generated and viewed by the at least one occupant based upon the current speed of travel of the vehicle. The selection can also be based on the characteristics of the at least one occupant of the vehicle. If the first, targeted media for presentation on the digital billboard cannot be generated for and viewed by the at least one occupant, second, generalized media is presented on the digital billboard based upon operational characteristics of the vehicle.

In some embodiments, the at least one occupant is a driver of the vehicle. In some embodiments, the second, generalized media comprises at least one of a safety warning and a safe driving recommendation based upon the characteristics of the driver.

In some embodiments, the method may comprise detecting proximity of at least one other vehicle to the digital billboard, obtaining operating characteristics of the least one other vehicle, and obtaining characteristics of at least one additional occupant of the at least one other vehicle. At least a current speed of travel of the at least one other vehicle can be determined. In can be estimated whether the first, targeted media for presentation on the digital billboard could be generated and viewed by the at least one occupant of each of the vehicles proximate to the digital billboard. This can be based upon the current speeds of travel of each of the vehicle. If the first, targeted media for presentation on the digital billboard cannot be generated for and viewed by the at least one occupant of each of the vehicles proximate to the digital billboard, second, generalized media on the digital billboard can be presented. The second, generalized media can be based upon aggregate operational characteristics of each of the vehicles proximate to the digital billboard.

In some embodiments, the method may further comprise determining whether the vehicle has declined targeted media presentation. Upon a determination that the vehicle has declined targeted media presentation, the digital billboard is controlled to generate at least one of a blank and non-informational presentation.

In some embodiments, the method further comprises determining whether the obtained operating characteristics of the vehicle comprises a vehicle setting opting out of targeted media for presentation on the digital billboard.

In accordance with one embodiment, a system comprises at least one processor, and at least one memory unit operatively connected to the processor. The at least one memory unit has stored thereon, at least one computer program comprising computer code causing the at least one processor to perform the following. Operating characteristics of a vehicle detected as being proximate to a digital billboard can be obtained. Characteristics of at least one occupant of the vehicle can be obtained. At least a current speed of travel of the vehicle can be obtained. The obtained operating characteristics of the vehicle, the characteristics of the at least one occupant, and the current speed of travel of the vehicle can be sent to a controller controlling operation of the digital billboard. The controller is adapted to estimate whether first, targeted media for presentation on the digital billboard selected based upon the characteristics of the at least one occupant and the operating characteristics of the vehicle could be generated and viewed by the at least one occupant. This estimate can be based upon the current speed of travel of the vehicle. If the first, targeted media for presentation on the digital billboard cannot be generated for and viewed by the at least one occupant, the digital billboard presents second, generalized media on the digital billboard based upon operational characteristics of the vehicle.

In some embodiments, at least one of the operating characteristics of the vehicle and the characteristics of the at least one occupant of the vehicle are obtained by a vehicle-to-infrastructure (V2I) capable roadside unit. In some embodiments, the V2I capable roadside unit obtains the at least one of the operating characteristics of the vehicle and the characteristics of the at least one occupant of the vehicle. This can be obtained by at least one of an electronic control unit of the vehicle, one or more sensors implemented in or associated with the vehicle, and a database in which at least one aspect of the characteristics of the at least one occupant are stored. In some embodiments, the controller controlling operation of the digital billboard is at least one of remotely located from the digital billboard and co-located with the digital billboard.

In some embodiments, the vehicle comprises an autonomous vehicle. The controller controlling operation of the digital billboard initiates transmission of a speed override command to the autonomous vehicle to reduce its speed to a speed allowing the targeted media to be viewed by the at least one occupant.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 2 is a schematic representation of an example dynamic road sign personalization system architecture.

FIG. 3C is a flow chart illustrating example operations that can be performed to dynamically personalize road signs in accordance with one embodiment.

Figure 1:
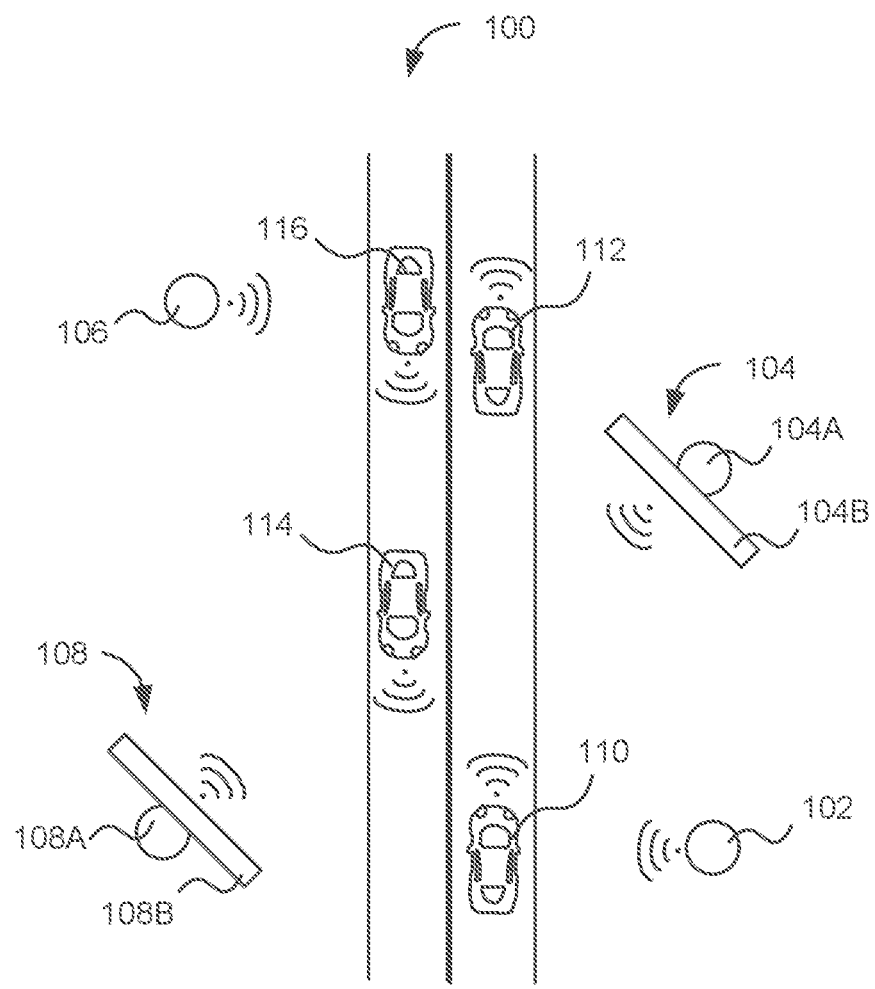
FIG. 1 is a graphical illustration or an example driving scenario for which dynamic road sign personalization in accordance with various embodiments may be used.

The figures are not exhaustive and do not limit the present disclosure to the precise form disclosed.

DETAILED DESCRIPTION

As alluded to above, conventional road signs are static in that they are not able to present targeted information to one or more occupants of a vehicle traveling proximate to such conventional road signs. Accordingly, various embodiments are directed to systems and methods of dynamic road sign personalization. Characteristics about a vehicle and/or one or more occupants in the vehicle can be obtained by an infrastructure component, such as a roadside unit of a vehicle-to-infrastructure (V2I) communications system. Vehicle characteristics can include, but are not limited to the vehicle's operating conditions (e.g., current speed, fuel efficiency, distance from a road sign, navigational destination, etc.), distance from the road sign, etc. Occupant characteristics can include, but are not limited to the occupant's age, demographic information, driving record, etc. The infrastructure component can relay data regarding these characteristics to a processing component, e.g., a centralized or distributed controller.

The controller can analyze the vehicle and/or occupant characteristics, and based on the vehicle and/or occupant characteristics, determine information relevant to the occupant. For example, if one of the occupants of the vehicle is a teenage driver, the controller, based on the driver's age, may determine that the road sign should display a personalized message reminding the teenage driver to drive carefully. For example, based on a navigational destination input by an occupant of the vehicle, the controller, based on this destination, may determine that the road sign should present personalized information regarding one or more places of interest at that destination.

In some embodiments, the infrastructure component may obtain relevant characteristics regarding current road conditions, such as current traffic state, delays, etc. The controller may determine or select personalized information to be presented by taking into account such road conditions in addition to the vehicle and/or occupant characteristics. Accordingly, the controller may relay the personalized information to the road sign so that the road sign can display the personalized information while the vehicle approaches or passes the road sign. For example road signs can be used to broadcast alternative routes based, e.g., on the destination of a vehicle and current traffic conditions.

Sometimes, traffic may be too congested, a vehicle may be traveling too fast, and/or a vehicle may not wish to have personalized information presented. In these types of scenarios, the controller may present more generalized information (but still personalized based upon vehicle characteristics) to vehicles passing by a road sign. For example, general driving fatigue warnings can be presented on highways for vehicles known to have been traveling for an extended period of time, information suggesting vehicles should slow down due to upcoming stops or slowdowns can be presented, etc.

Road signs can be controlled by municipalities, such as states, cities, etc., as well as by private entities, such as product and/or service providers wishing to advertise on roadways. Road signs that dynamically present personalized information can be used to improve the safety of vehicle occupants, increase advertising revenue, and/or mitigate traffic slowdowns due to daily commute congestion, roadwork, accidents, etc.

FIG. 1 illustrates an example scenario in which road signs may be personalized. FIG. 1 illustrates a section of roadway 100 on which one or more vehicles may be traveling. In this illustrated example, vehicles 110 and 112 are traveling in a first direction along roadway 100. Along a first side of roadway 100, a roadside unit 102 may obtain data regarding vehicle and/or occupant characteristics, as well as road conditions in a proximate area about roadside unit 102, an area(s) prior to roadside unit 102 and/or subsequent to roadside unit 102.

Additionally, the first side of roadway 100 may include a road sign 104. Road sign 104 may be a billboard or other sign posted along a roadway and visible to one or more occupants of one or more vehicles traveling along the roadway. In some embodiments, road sign 104 may have a transceiver 104A for receiving one or more signals, e.g., wireless signals, from one or more roadside units, e.g., roadside unit 102. It should be understood that transceiver 104A may receive and/or transmit signals, and in some embodiments, transceiver 104A may be embodied as either a transmitter or a receiver. The one or more signals may be the aforementioned data characterizing a vehicle's operating conditions, occupant characteristics, and/or road conditions of, e.g., roadway 100 or other relevant roadways. In some embodiments, the one or more signals may be data representative of the personalized information to be presented via road sign 104.

Road sign 104 may further comprise a display 104B through which personalized information may be displayed to one or more occupants of one or more vehicles passing by road sign 104. In some embodiments, road sign 104 may incorporate one or more speakers (not shown) or other auditory devices for announcing or otherwise broadcasting/outputting audio information to the one or more occupants of the one or more vehicles. In some embodiments, roadside unit 104 may have a controller implemented therein for receiving vehicle/occupant characteristics data and/or road conditions data, and for determining relevant, personalized information to present. In some embodiments, roadside unit 104 may be configured to operatively communicate with a remotely located controller to receive signals representative of the relevant, personalized information to be presented. In still other embodiments, transceiver 104A may also be configured to communicate with other road signs, such as road sign 108 on a second side of roadway 100 and/or roadside unit 106.

As previously noted, roadway 100 may have a second side on which additional vehicles, e.g., vehicles 114 and 116, are traveling in a second direction. This second side of roadway 100 may further include a roadside unit 106, as well as road sign 108. Similar to road sign 104, road sign 108 may comprise a transceiver 108A for receiving one or more signals, e.g., wireless signals, from one or more roadside units, e.g., roadside unit 106. It should be understood that transceiver 108A may receive and/or transmit signals, and in some embodiments, transceiver 108A may be embodied as either a transmitter or a receiver. The one or more signals may be the aforementioned data characterizing a vehicle's operating conditions, occupant characteristics, and/or road conditions of, e.g., roadway 100 or other relevant roadways. In some embodiments, the one or more signals may be data representative of the relevant, personalized information to be presented via road sign 108.

Road sign 108 may further comprise a display 108B through which personalized information may be displayed to one or more occupants of one or more vehicles passing by road sign 108. In some embodiments, road sign 108 may incorporate one or more speakers (not shown) or other auditory devices for announcing or otherwise broadcasting/outputting audio information to the one or more occupants of the one or more vehicles. In some embodiments, roadside unit 108 may have a controller implemented therein for receiving vehicle/occupant characteristics data and/or road conditions data, and for determining relevant, personalized information to present. In some embodiments, roadside unit 108 may be configured to operatively communicate with a remotely located controller to receive signals representative of the relevant, personalized information to be presented. In still other embodiments, transceiver 108A may also be configured to communicate with other road signs, such as road sign 104 on the first side of roadway 100.

Although FIG. 1 only illustrates two roadside units 102 and 106, as well as two road signs 104 and 108, it should be understood that this is not limiting, and that any number of roadside units and/or road signs may be implemented on roadway 100. Moreover, road signs 104 and 108 need not be located on either side of roadway 100. Road signs may be raised and centrally located between the first and second sides of roadway 100. Road signs may be located at road/vehicle occupant eye-level. Still other locations and manners of implementing one or more road signs are contemplated herein. The size and/or shape of road signs 104 and 108 may also be variable. Moreover, road signs 104 and/or 108 may be digital displays such as light-emitting-diode displays or other displays using other technology(ies) known to those of ordinary skill in the art.

In order to present personalized information to a vehicle, e.g., vehicle 110, roadside unit 102 may obtain, through, e.g., V2I communications (described below), one or more vehicle characteristics such as the speed at which vehicle 110 is traveling roadway 100 proximate to road sign 104. For example, roadside unit 102 may obtain data indicating that vehicle 110 is traveling at a consistent (e.g., not accelerating) 55 mph on roadway 100, which may be a two-lane highway. This data may be relayed by a V2I communications component implemented in vehicle 110. Roadside unit 102 may, based on current speed/acceleration data from vehicle 110 and/or observed data, calculate the distance vehicle 110 is from road sign 104. Alternatively, roadside unit 102 may, estimate vehicle 110's distance from road sign 104 by virtue of knowing its own distance from road sign 104. It should be noted that various systems and methods of data gathering regarding vehicle 110 may be leveraged to obtain the characteristics data regarding vehicle 110.

Roadside unit 102 may further obtain occupant characteristics of one or more occupants in vehicle 110, for example, the driver and/or passengers of vehicle 110. For example, roadside unit 102 may obtain the age of the driver and passengers of vehicle 110, how long the driver has been behind the wheel, and the destination to which vehicle 110 is traveling. The relevant ages may be obtained through various mechanisms. For example, one more sensors located in vehicle 110, such as biometric sensors can capture facial features indicative of age. Satellite radio account information associated with vehicle 110 can be access, as can a user profile associated with a key fob used to operate vehicle 110.

In some embodiments, as long as the occupants of vehicle 110 permit data collection, the occupants' web browsing history or other relevant data can be accessed from the occupants' respective smart phones. It should be noted that various systems and methods of data gathering may be leveraged to obtain the characteristics data regarding the one or more occupants of vehicle 110.

The obtained characteristics data may be relayed by roadside unit 102 to road sign transceiver 104A, which may then relay the characteristics data to a local controller of road sign 104 or a remotely located controller (discussed below). In the case of a local controller, the local controller may analyze the obtained characteristics data to determine personalized information to be presented to the one or more occupants of vehicle 110. Personalized information to present, e.g., age-relevant points of interests that vehicle 110 will come across by traveling to the destination, can be selected. A determination can be made to calculate whether the current speed of travel/acceleration of vehicle 110 and/or current traffic conditions will allow the personalized road sign display 104B to present the personalized information in time for the one or more occupants to consume the personalized information as vehicle 110 approaches and/or passes by road sign 104.

It should be noted that the controller may take into account the positioning of road sign display 104B to determine whether or not the one or more occupants (or which ones of the one or more occupants) may, e.g., view visually presented, personalized information. For example, it would be undesirable for the driver of vehicle 110 to have to crane his/her neck or look away from roadway 100 to view the personalized information. It should be noted that various embodiments need not be limited to singular instances or presentations of personalized information. For example, in some embodiments, provided the one or more occupants of vehicle 110 have enough time to view multiples instances of personalized information, multiple instances of personalized information can be presented. Moreover, in some embodiments, road sign 104, for example, may have a rotating or pivoting road sign display 104B to effectuate more convenient viewing by one or more occupants of vehicle 110.

In some embodiments, the characteristics data may be relayed to a remotely located controller that may be adapted to analyze the characteristics data and select appropriate, personalized information to be displayed on road sign 104. Upon performing the analysis and selecting appropriate, personalized information, the personalized information, which may be visual information, can be transmitted from the remotely located controller to road sign transceiver 104B. Upon receipt by road sign transceiver 104B, the personalized information may be stored in a local data repository (discussed below). The local controller of road sign 104 may retrieve the personalized information from the local data repository and control road sign display 104B to display the personalized information.

FIG. 2 illustrates an example architecture of a dynamic road sign personalization system 200 in accordance with various embodiments. System 200 may communicate with one or more vehicles directly or through an intermediate system element, such as a roadside unit, alluded to above. In this example, vehicle 202, which may be an embodiment of vehicle 110 of FIG. 1, may communicate with one or more roadside units 204, which may be an embodiment of roadside units 102 and/or 106 of FIG. 1. For example, vehicle 202 may transmit its respective operating characteristics to one or more roadside units 204. It should be understood that in some embodiments, the functionality of a roadside unit may be embodied in a road sign. Thus, in some embodiments, vehicle 202 may transmit its operating characteristics to one or more road sign transceivers 210. In some embodiments, operating characteristics of vehicle 202 may be sent to more than one element of system 200. This may be done, for example, to provide redundancy and/or to provide multiple sources of information that can be compared or used as a way to verify the validity of received information, as well as increase accuracy of the information. For example, an embedded roadway sensor (used by a roadway unit to obtain current road or traffic conditions) may not be operating correctly, and may incorrectly determine a vehicle's proximity to a roadside unit, road sign, intersection, etc. This misinformation can be mitigated if, e.g., a vehicle provides its own proximity (distance calculations) and one or more other sensors or roadway infrastructure provide their respective proximity determinations.

It should be further understood that vehicle 202 may have an electronic control unit (ECU) 202A that control one or more operating aspects of their respective vehicles. For ease of explanation, it is assumed that relevant operating characteristics of a vehicle can be determined by that vehicle's ECU, and transmitted to one or more elements of system 200. However, operating characteristics may be determined by separate sensors or systems in a vehicle and transmitted separately. It may also be assumed that vehicle 202 may have one or more data stores (not shown) for maintaining fuel economy logs, recent or historical driving characteristics/events, and the like.

Vehicle 202 may also have communication units (not shown), e.g., wireless/radio frequency-based communications units for communicating with system 200 and/or each other. In some embodiments, vehicle 202 may not have V2I communications capabilities (described below). Communications may be short-range, medium-range, and/or long-range-based communications, and may involve communications over one or more networks, such as Bluetooth, Wi-Fi, cellular, vehicular, and other networks. In some embodiments, communications with road infrastructure, such as roadside units 204, can be effectuated using, at least in part, on board units configured to communicate over dedicated short-range communications channels. An example of dedicated short-range communications channels are channels in the 5.9 GHz band allocated for use by intelligent transportation systems.

Roadside units 204 may be various types of communications nodes in a vehicular communication network, such as a V2I communications network. In some embodiments, roadside units 204 may be configured to operate as, e.g., dedicated short-range communications devices. In some embodiments, roadside units 204 may communicate with one another, as well as with one or more other entities. Those entities may be information providers that disseminate, e.g., traffic-related information, that roadside units 204 may forward to vehicles and/or retain as information, e.g., road conditions, to be used in various embodiments for determining current road conditions, traffic conditions, etc.

Road sign controller 206 may be a localized controller implemented in a particular road sign, e.g., road sign 104 of FIG. 1. In another embodiment, road sign controller 208 may be a centralized or distributed controller configured to control one or more road signs within, e.g., a city, municipality, state, or other entity, and/or within a certain area of operation. In some embodiments, road sign controller 206 may be implemented in a roadside unit, e.g., at least one of roadside units 204. In addition to determining what and/or when personalized information should be presented, road sign controller 206 may determine on/through which road sign(s) to present personalized information. For example, if a vehicle is determined to exiting a freeway and the presentation of personalized information is warranted, road sign controller 206 may push or transmit selected personalized information to an exit sign or road signs near the exit as opposed to a roadside billboard. In some embodiments, a vehicle may make a turn, such as a U-turn, or turn into another lane, another section of roadway, etc. In such embodiments, road sign controller 206 may determine on which road sign to present personalized information. In some embodiments, road sign controller 206 may select a road sign on which to present personalized information based on optimum or preferred visibility. For example, in a four-lane highway with a center divide section, road sign controller 206 may opt to present personalized information on a road sign located on a right hand side of the roadway for a vehicle traveling in the right lane. If however, a vehicle to which personalized information is to be presented is traveling in the left lane of the roadway, the road sign controller 206 may opt to present personalized information on a road sign located in the center divide section of the roadway.

One or more databases 208 may be used to store personalized information, such as a media clips, images, videos, audio, and/or other forms of information that can be presented on or through a road sign. In other embodiments, one or more databases 208 may store vehicle, road, and/or vehicle occupant characteristics data. In the case of occupant characteristics data, one or more databases 208 may comprise web-related histories, such as browsing histories, personal information, such as account information, e.g., social media account information, etc.

In some embodiments, one or more databases 208 may store public or other accessible vehicle characteristics data. For example, as noted above, a vehicle may not have V2I communications capabilities. However, various embodiments, through the use of infrastructure sensors, e.g., a roadside units 204, may detect vehicle identification information, e.g., license plate numbers, vehicle model/make via vehicle badging, etc. In this way, even if characteristics data specific to a vehicle cannot be obtained, road sign controller 206 may still ascertain one or more characteristics that can be relevant to determining personalized information to be presented on or by a road sign. For example, certain demographic information indicative of a buyer of a make/model of vehicle can be obtained and assumed to apply to an occupant of a vehicle approaching a road sign. Personalized information that may be based upon occupant demographics can leverage such data. As another example, one or more road sign controllers associated with one or more road signs may detect, via license plate detection at a gas station along a highway, that a particular vehicle has traveled X number of miles by the time it has reached a particular roadside unit. Accordingly, road sign controller 206 associated with a road sign proximate to the vehicle may determine presentation of a gas fill-up reminder to the vehicle via a road sign would be appropriate.

Figure 3A:
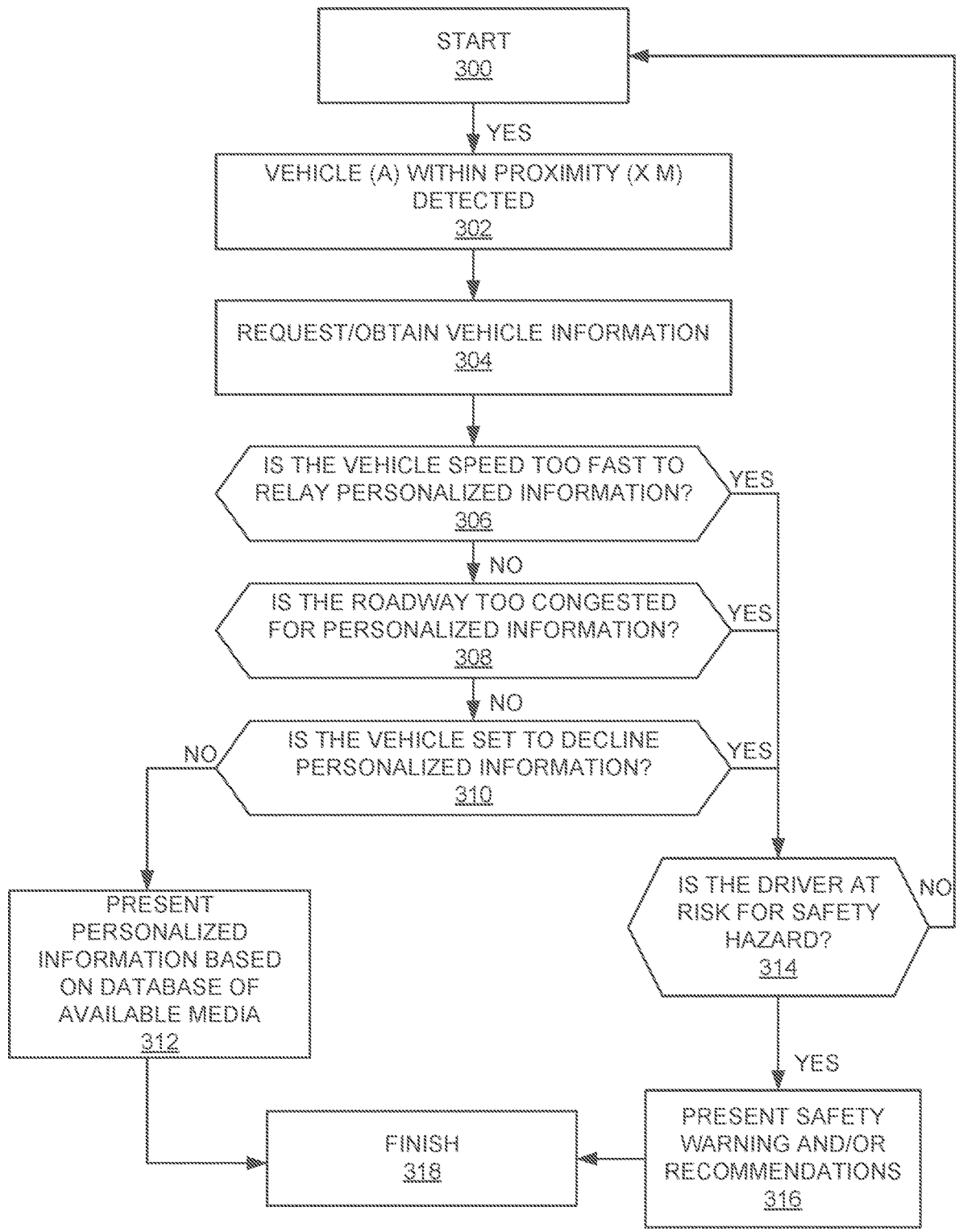
FIG. 3A is a flow chart illustrating example operations that can be performed to dynamically personalize road signs in accordance with one embodiment.

FIG. 3A is a flow chart illustrating example operations that can be performed to effectuate dynamic road sign personalization in accordance with one embodiment. At a starting operation 300, V2I communications capabilities may be enabled in a vehicle. At operation 302, a determination can be made to ascertain whether a vehicle is proximate to a road sign. As described above, proximity can be determined by roadway infrastructure, such as one or more embedded roadway sensors, one or more V2I roadside units, etc. Sensors may also include, but are not limited to, e.g., still and/or video cameras, radar or lidar units, etc. Proximity may also be determined by a vehicle's own sensors and/or information systems. For example, many modern vehicles have navigation systems in which a route to-be-traveled may be input, as well as on board units that receive V2I data. Moreover, many modern vehicles may receive traffic-related information from information providers over radio frequency channels that can be used alone or in conjunction with a navigation system. Accordingly, a vehicle may itself determine how far away it is from a road sign (which can be identified by road features such as road signs themselves, e.g., road name signs, entrance/exit ramp signs, etc.). Additionally, cellular phones or similar mobile devices may be used as a navigation system in a vehicle. Such mobile devices can also be configured to communicate with roadway infrastructure in order to receive information and relay, in this case, proximity information.

It should be noted that although some embodiments disclosed herein contemplate sensing the proximity of a single vehicle, and providing personalized information to that single vehicle. Other embodiments contemplate sensing the proximity of and presenting personalized to more than one vehicle. For example, groups of vehicles may comprise a caravan of occupants traveling together. If this scenario is identified, e.g., by some extended portion of a roadway traveled together, by common vehicle operating conditions, e.g., all vehicles in a group of vehicles brake together, accelerate together, etc., personalized information can be presented to the group. The personalized information to be presented can be determined based on group operating characteristics, whether the vehicles and/or the occupants of those vehicles.

At operation 304, information about operating characteristics of the vehicle proximate to one or more road signs, as well as road conditions, and/or occupant characteristics can be obtained. In some embodiments, V2I communications can be leveraged to obtain such information. Moreover, in some embodiments, vehicle-to-vehicle (V2V) communications can be used to exchange information regarding vehicle operating characteristics, e.g., in accordance with a group scenario. For example, a group of vehicles may opt out of personalized information or may share, or a group of occupants in various vehicles may share operating conditions so that a roadside unit considers the vehicles to be a group of vehicles to be presented with the same personalized information. In some embodiments, roadside units may request vehicle/occupant characteristics data. In some embodiments, vehicles may push vehicle/occupant characteristics data. In some embodiments, upon identifying a vehicle and/or one or more occupants of the vehicle, a roadside unit may access one or more other data stores, information servers, information service providers, and the like to obtain relevant characteristics data regarding the vehicle and/or its occupant(s).

Road conditions may encompass a variety of types of information, and may reflect current or historical characteristics of a particular road or section of road that can impact driving safety, commute/travel time, and/or advertising opportunities. For example, road conditions may include current or historical traffic conditions, evidence of a local event, e.g., a football game, that can impact what personalized information to present, current weather conditions, whether a curve or up/downgrade precedes or follows an intersection, etc. For example, current or historical traffic conditions may be used to determine whether or not personalized information is appropriate for presentation. That is, in stop-and-go traffic conditions, for example, vehicle occupants may not want to have personalized information that can identify them to be displayed to other vehicle occupants. For example, if slow traffic is being caused by vehicles exiting a sports stadium, road signs can determine and present alternative routes depending on vehicles' respective destinations, suggestions for after-game festivities, and the like. Vehicles entering a sports stadium may be directed to tune to a particular radio station to hear an ongoing sporting event/game, if it is determined that the vehicle is late is arriving to the sporting event/game. Road conditions, such as weather, and upcoming road features may prompt the presentation of safety warnings to vehicle occupants.

Occupant characteristics data may include occupant(s) age, demographic data, travel origin, travel destination, driving record data, purchase history, travel history, and the like. Occupant characteristics data can impact advertising, e.g., age-appropriate advertising may be presented to vehicle occupants. Travel history can impact what points of interest may be advertised. Travel origin and/or destination can also impact points of interest to be advertised as well as when to display safety warnings, such as suggested rest areas where a driver of the vehicle can rest, locations of upcoming refueling/recharging stations, etc. In some embodiments, one or more occupants may want personalized information to be directed to the one or more occupants license plate number (rather than occupant name) or social media handle, etc. In some embodiments, biometric sensors may be used to detect potential driver drowsiness, which may prompt an personalized audio-visual presentation suggesting a rest area and/or slowing down, alerting the driver to his/her condition, etc.

Vehicle operating characteristics data may comprise current speed and/or acceleration, fuel efficiency/fuel economy level, driving and/or travel statistics (e.g., tire wear, fuel level, battery state of charge in the case of hybrid/electric vehicles, hours of continuous operations, etc.). Vehicle operating characteristics may also impact when to display safety warnings, e.g., the number of hours of continuous operation of a vehicle may prompt the display of a suggested rest area, refueling/recharging station, etc. Vehicle operating characteristics data may also provide data upon which a decision to present personalized information, e.g., speed of approach to a road sign, can be based.

At operation 306, vehicle speed may be obtained/determined in order to ascertain whether or not the vehicle occupant(s) will be able to consume, e.g., view and/or hear, a personalized message, advertisement, warning, etc. The thresholds and/or parameters for this operation can vary. For example, the distance between a roadside unit and an upcoming road sign, and/or when vehicle/road/occupant(s) characteristics data is obtained in advance of reaching a road sign can determine when a vehicle is traveling too fast. That is, the close a roadside unit is to a road sign, the slower a vehicle should be traveling in order to consume a presentation of personalized information. The number of occupants in a vehicle may also impact this operation. For example, a road sign controller may be configured to present personalized information to each occupant of a vehicle. Accordingly, more time is needed (i.e., a vehicle should be traveling slower) to accommodate viewing by multiple vehicle occupants. It should be noted that as described above, personalized information can be presented on selected road signs. Accordingly, if it is determined that the vehicle is traveling too fast for personalized information to be presented on a proximate road sign, a road sign further ahead on the roadway may be selected to present the personalized information.

At operation 308, road conditions, such as congestion may be used as a basis for determining whether or not personalized information is presented to one or more vehicle occupants. For example, as alluded to above, high levels of road congestion may result in multiple vehicles being proximate to a road sign. Occupants of these multiple vehicles would, thus, be able to view personalized information intended for another occupant. Moreover, in the case of presenting targeted advertising, a personalized advertisement for a first occupant of a first vehicle may not be relevant to a second occupant of a second vehicle. Accordingly, the presentation of personalized information may be avoided.

At operation 310, it is determined whether or not a vehicle/vehicle occupant(s) wishes to opt out of personalized information presentations. As described above, an occupant may, for privacy reasons, wish not to receive personalized information. In some embodiments, parents/vehicle owners, such as taxi cab owners may wish to prevent a teenage driver/working taxi cab driver from receiving personalized information that may ultimately distract them from driving. Vehicles that are associated with drivers having poor driving records may result in a road sign, such as billboard being blacked out.

At operation 312, personalized information can be presented based upon one or more databases or data stores of available media. For example, a database may contain advertising media for any points of interests, restaurants, etc. in a given area that a road sign controller may access. In some embodiments, the database may contain instructions for augmenting a road sign. For example, vehicles that are associated with drivers have a record of speeding may prompt speed limit signs to blink or otherwise increase their visibility to such drivers.

In some embodiments, priority may be given to certain vehicles and/or vehicle occupants. For example, priority regarding the presentation of upcoming rest areas may take precedence over strict targeted advertising if a vehicle/vehicle driver is determined to have been driving for some extended period of time. Vehicles whose navigation systems may indicate a destination is on a road trip may be afforded priority regarding the presentation of personalized advertisements regarding their destination versus a vehicle whose navigation system or observed historical travel suggests travel merely to a nearby refueling station. In some embodiments, the number of occupants may be the basis for prioritized presentation of personalized information. For example, the number of occupants may translate to increased potential for sales. Accordingly, only vehicles with a certain number of occupants may be presented with personalized information in some embodiments.

At operation 318, the disclosed operations may finish.

In the event that the vehicle speed is too fast to relay personalized information, the roadway is too congested to present personalized information, and/or the vehicle is set to decline personalized information, a determination for an alternative presentation is made. That is, at operation 314, a determination can be made as to whether or not the driver is at risk for some safety hazard, e.g., dozing off, engaging in excessive lane changes, speeding, etc. Determining whether the driver is at risk may depend on a previous analysis regarding vehicle occupant characteristics data, road conditions, and/or vehicle operating characteristics data discussed above. If the driver is at risk, at operation 316, the appropriate safety warnings and/or recommendations may be presented. Again, at operation 318, the disclosed operations may finish. If the driver is not at risk regarding some safety hazard, operation may return to operation 300.

Figure 3B:
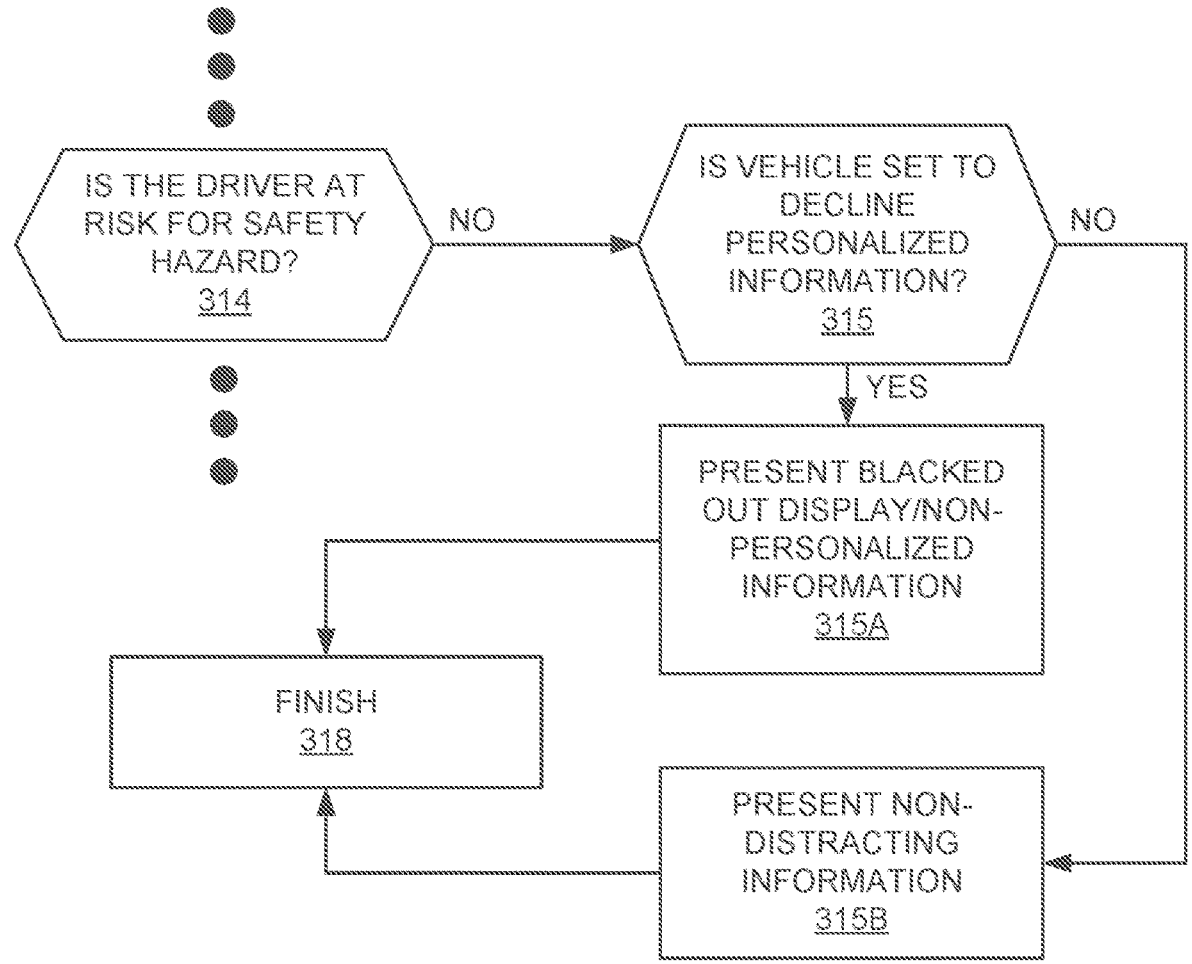
FIG. 3B is a flow chart illustrating example operations that can be performed to dynamically personalize road signs in accordance with one embodiment.

FIG. 3B is a flow chart illustrating example operations that can be performed to dynamically personalize road signs in accordance with one embodiment. In this embodiment, personalizing road signs may entail tailoring a display/presentation to accommodate vehicle operators/occupants that do not want to have personalized information, e.g., targeted advertising, presented to them. As previously described with respect to FIG. 3A, a determination may be made regarding ascertaining whether or not a driver is at risk for some safety hazard at operation 314. In accordance with some embodiments, at operation 315, another determination can be made as to whether or not the vehicle is set to decline personalized information at operation 315 (after determining that the driver is not at risk), i.e., it is determined whether or not a vehicle/vehicle occupant(s) wishes to opt out of personalized information presentations. If so, a blacked out road sign display may be presented at operation 315A. Alternatively, a non-personalized presentation of information may be presented at operation 315A. For example, more generalized information can be displayed, e.g., "screensaver" images/media, weather forecast, traffic updates, and the like. If the vehicle is not set to decline personalized information, at operation 315B, non-distracting information may be presented. The presentation of non-distracting information at operation 315B may include personalized information, advertisements, and the like.

FIG. 3C is a flow chart illustrating example operations that can be performed to dynamically personalized road signs in accordance with one embodiment. In this embodiment, the flow chart illustrates example operations that may be applicable to an autonomous vehicle, and thus, driver distraction need not necessarily be considered. At operation 306, as described above, vehicle speed may be obtained/determined in order to ascertain whether or not the vehicle occupant(s) will be able to consume, e.g., view and/or hear, a personalized message, advertisement, warning, etc. In this embodiment, a subsequent determination can be made at operation 307, i.e., is a speed override mode enabled. A speed override mode can be enabled in order to allow one or more stimuli/triggers to prompt operation of the autonomous vehicle at a reduced speed. In the event it is, at operation 309, a command is issued to the autonomous vehicle to reduce its speed in order to allow personalized information to be presented to one or more occupants in the autonomous vehicle.

In some embodiments, the command may be issued by one or more infrastructure components of system 200, e.g., roadside unit 204, road sign transceiver 210, etc. In some embodiments, the command may be issued by a neighboring vehicle via V2V or other communications mechanism. This may be useful when the personalized information is targeted to a group of vehicle, all or some of which may be autonomous. For example, a first vehicle may receive a command to reduce its speed, and the first vehicle may communicate with a second vehicle to relay or forward the command to reduce speed. It should be understood that reducing the speed of an autonomous vehicle may entail checking the speed of neighboring vehicles to determine that a reduction in speed would be safe.

If the speed override mode is not enabled, the method may return to operation 308, where a determination can be made as to whether or not the roadway is too congested for presenting personalized information. At operation 310A, similar to operation 310 described above, it is determined whether or not a vehicle/vehicle occupant(s) wishes to opt out of personalized information presentations. If not, at operation 310B (similar to operation 312 described above), personalized information can be presented based upon one or more databases or data stores of available media. For example, a database may contain advertising media for any points of interests, restaurants, etc. in a given area that a road sign controller may access. In some embodiments, the database may contain instructions for augmenting a road sign. For example, vehicles that are associated with drivers have a record of speeding may prompt speed limit signs to blink or otherwise increase their visibility to such drivers.

At operation 310C, additional actions may be taken to direct occupant(s) attention to the personalized information 310C. For example, visual and/or auditory signals may be presented, e.g., blinking lights, flashing the personalized information, emitting one or more alerting sounds, etc. It should be understood that these are merely examples of mechanisms that can be used to direct attention to a road sign.

At operation 310D, personalized information presented on a road sign may be duplicated and/or enhanced on an in-vehicle display. For example, additional related information may be presented. In some embodiments, website URLs, telephone numbers, and the like may be presented in conjunction with the personalized information presented on a road sign. In some embodiments related, personalized information may be presented. In some embodiments, the personalized information may be further personalized with additional information, such as the presentation of automated response options, e.g., visiting a website, calling an advertised establishment, automatically tuning to a radio station, etc.

If the roadway is determined to be too congested for the presentation of personalized information, at operation 310E, another determination may be made as to whether or not the vehicle is set to decline personalized information. If so, at operation 310F, a blacked out road sign display may be presented. Alternatively, a non-personalized presentation of information may be presented at operation 310F. For example, more generalized information can be displayed, e.g., "screensaver" images/media, weather forecast, traffic updates, and the like. If the vehicle is not set to decline personalized information at operation 310E, non-distracting information may be presented at operation 310G. As previously noted, the presentation of non-distracting information at operation 310G may include personalized information, advertisements, and the like.

Figure 4:
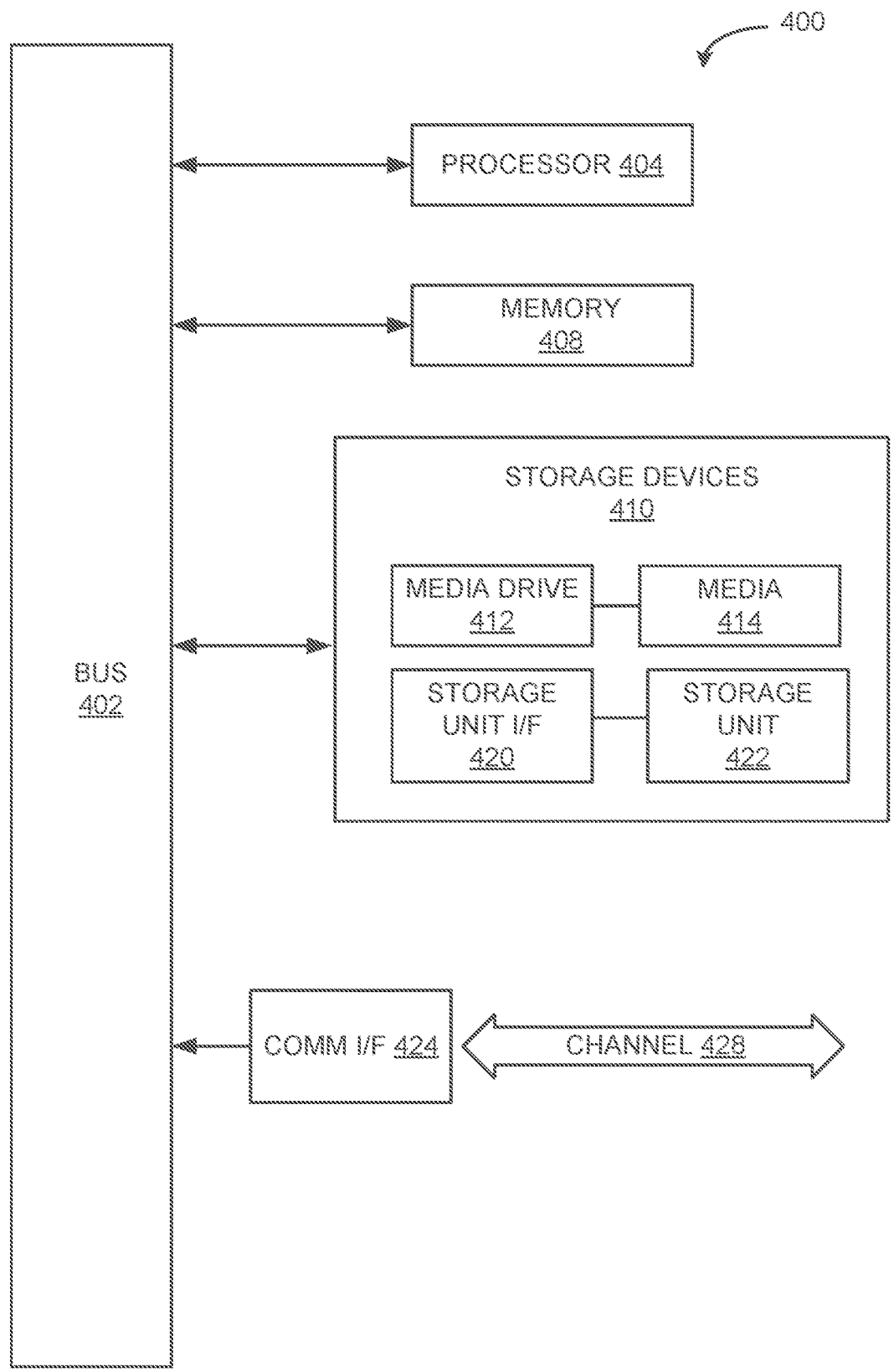
FIG. 4 is an example computing component that may be used to implement various features of embodiments described in the present disclosure.

As used herein, the term component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 4. Various embodiments are described in terms of this example-computing component 400. After reading this description, it will become apparent to a person skilled in the relevant art how to implement the application using other computing components or architectures.

Referring now to FIG. 5, computing component 400 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 400 might also represent computing capabilities embedded within or otherwise available to a given device. For example, a computing component might be found in other electronic devices such as, for example, portable computing devices, and other electronic devices that might include some form of processing capability.

Computing component 400 might include, for example, one or more processors, controllers, control components, or other processing devices. This can include a processor, and/or any one or more of the components making up dynamic road sign personalization system 200 and its component parts, road sign controller 206, ECU 202A of vehicle 202, etc. Processor 404 might be implemented using a general-purpose or special-purpose processing engine such as, for example, a microprocessor, controller, or other control logic. Processor 404 may be connected to a bus 402. However, any communication medium can be used to facilitate interaction with other components of computing component 400 or to communicate externally.

Computing component 400 might also include one or more memory components, simply referred to herein as main memory 408. For example, random access memory (RAM) or other dynamic memory, might be used for storing information and instructions to be executed by processor 404. Main memory 408 might also be used for storing temporary variables or other intermediate information during execution of instructions to be executed by processor 404. Computing component 400 might likewise include a read only memory ("ROM") or other static storage device coupled to bus 402 for storing static information and instructions for processor 404.

The computing component 400 might also include one or more various forms of information storage mechanism 410, which might include, for example, a media drive 412 and a storage unit interface 420. The media drive 412 might include a drive or other mechanism to support fixed or removable storage media 414. For example, a hard disk drive, a solid state drive, a magnetic tape drive, an optical drive, a compact disc (CD) or digital video disc (DVD) drive (R or RW), or other removable or fixed media drive might be provided. Storage media 414 might include, for example, a hard disk, an integrated circuit assembly, magnetic tape, cartridge, optical disk, a CD or DVD. Storage media 414 may be any other fixed or removable medium that is read by, written to or accessed by media drive 412. As these examples illustrate, the storage media 414 can include a computer usable storage medium having stored therein computer software or data.

In alternative embodiments, information storage mechanism 410 might include other similar instrumentalities for allowing computer programs or other instructions or data to be loaded into computing component 400. Such instrumentalities might include, for example, a fixed or removable storage unit 422 and an interface 420. Examples of such storage units 422 and interfaces 420 can include a program cartridge and cartridge interface, a removable memory (for example, a flash memory or other removable memory component) and memory slot. Other examples may include a PCMCIA slot and card, and other fixed or removable storage units 422 and interfaces 420 that allow software and data to be transferred from storage unit 422 to computing component 400.

Computing component 400 might also include a communications interface 424. Communications interface 424 might be used to allow software and data to be transferred between computing component 400 and external devices. Examples of communications interface 424 might include a modem or softmodem, a network interface (such as an Ethernet, network interface card, WiMedia, IEEE 802.XX or other interface). Other examples include a communications port (such as for example, a USB port, IR port, RS232 port Bluetooth® interface, or other port), or other communications interface. Software/data transferred via communications interface 424 may be carried on signals, which can be electronic, electromagnetic (which includes optical) or other signals capable of being exchanged by a given communications interface 424. These signals might be provided to communications interface 424 via a channel 428. Channel 428 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 408, storage unit 420, media 414, and channel 428. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 400 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method, comprising:
    detecting that a vehicle is proximate to a digital billboard;
    obtaining operating characteristics of the vehicle;
    obtaining characteristics of one or more occupants of the vehicle;
    selecting targeted media for presentation on the digital billboard based on the operating characteristics of the vehicle and the characteristics of the one or more occupants of the vehicle when the vehicle is proximate to the digital billboard;
    before presenting the selected targeted media on the digital billboard, determining whether the vehicle is within a threshold speed when the vehicle is proximate to the digital billboard such that at least one of the one or more occupants of the vehicle will be able to consume the targeted media selected for presentation by the digital billboard; and
    determining whether to present the selected targeted media on the digital billboard based on detecting that the vehicle is proximate to the digital billboard, and further based on determining whether the vehicle is within a threshold speed to enable at least one of the one or more occupants of the vehicle to consume the selected targeted media presentation by the digital billboard.

2. The method of claim 1, further comprising:
    detecting proximity of another vehicle to the digital billboard;
    obtaining operating characteristics of the other vehicle;
    obtaining characteristics of one or more additional occupants of the other vehicle;
    determining a current speed of travel of the other vehicle; and
    determining whether to present the targeted media on the digital billboard based on the current speeds of travel of both the vehicle and the other vehicle.

3. The method of claim 2, wherein determining whether to present the targeted media on the digital billboard based on the current speeds of travel of both the vehicle and the other vehicle comprises determining whether the current speeds of travel of the vehicle and the other vehicle are both below the threshold speed.

4. The method of claim 3, further comprising presenting generalized media on the digital billboard based on the operating characteristics of both the vehicle and the other vehicle when the current speed of travel of either the vehicle or the other vehicle is above the threshold speed.

5. The method of claim 2, wherein determining whether to present the targeted media on the digital billboard is determined based on group operating characteristics of the vehicle and the other vehicle.

6. The method of claim 1, further comprising determining whether the vehicle has declined the selected targeted media, and upon a determination that the vehicle has declined the selected targeted media, controlling the digital billboard to not present the selected targeted media.

7. The method of claim 1, further comprising determining whether the obtained operating characteristics of the vehicle comprises a vehicle setting opting out of targeted media for presentation on the digital billboard.

8. The method of claim 1 wherein the determination as to whether to present the targeted media on the digital billboard based on detecting that the vehicle is proximate to the digital billboard and further based on determining whether the vehicle is within a threshold speed comprises comparing a current speed of travel of the vehicle to the threshold speed and further comprises comparing a current distance of the vehicle from the digital billboard to a threshold distance.

9. The method of claim 8, wherein at least one of the one or more occupants of the vehicle is a driver of the vehicle.

10. The method of claim 8, further comprising presenting the targeted media on the digital billboard when the current speed of travel of the vehicle is below the threshold speed and presenting generalized media on the digital billboard when the current speed of travel of the vehicle is above the threshold speed.

11. The method of claim 10, wherein the generalized media comprises at least one of a safety warning and a safe driving recommendation based on the characteristics of a driver of the vehicle.

12. The method of claim 11, further comprising determining whether the driver is at risk for a safety hazard based on the operating characteristics of the vehicle, the characteristics of the at least one of the one or more occupants of the vehicle, and other road conditions data.

13. The method of claim 12, wherein the safety hazard is a speed of travel of the vehicle and the safety warning and the safe driving recommendation advise the driver to reduce speed of the vehicle.

14. The method of claim 10, wherein the threshold speed is determined based on whether an occupant of the vehicle for the targeted media is a driver or a passenger.

15. The method of claim 1, further comprising determining whether a driver of the vehicle is at risk for a safety hazard based on the operating characteristics of the vehicle, the characteristics of the driver of the vehicle, and other road conditions data.

16. The method of claim 1, wherein the targeted media presented by the digital billboard comprises information personalized to each of the one or more occupants of the vehicle.

17. The method of claim 1, wherein the threshold speed is determined based on a distance of the vehicle from the digital billboard.

18. A system, comprising:
a processor; and
a memory unit operatively connected to the processor, the memory unit having stored thereon, a computer program comprising computer code causing the processor to perform operations comprising:
obtain operating characteristics of a vehicle upon detecting that the vehicle is proximate to a digital billboard;
obtain characteristics of an occupant of the vehicle;
determine a current speed of travel of the vehicle;
transmit the obtained operating characteristics of the vehicle, the characteristics of the occupant, and the current speed of travel of the vehicle to a controller controlling operation of the digital billboard, the controller adapted to select targeted media for presentation on the digital billboard when the vehicle is proximate to the digital billboard;
before presenting the selected targeted media on the digital billboard, determining whether the vehicle is within a threshold speed when the vehicle is proximate to a digital billboard such that at least one of the occupant of the vehicle will be able to consume the targeted media selected for presentation by the digital billboard; and
determining whether to present the selected targeted media on the digital billboard based upon detecting that the vehicle is proximate to the digital billboard and further based upon determining whether the vehicle is within a threshold speed to enable at least one of the occupant of the vehicle to consume the selected targeted media presentation by the digital billboard.

19. The system of claim 18 wherein the computer program causes the processor to further perform operations comprising:
control the digital billboard to present generalized media on the digital billboard, when it is determined that the occupant of the vehicle is not able to consume the targeted media presented by the digital billboard.

20. The system of claim 18, wherein the operating characteristics of the vehicle and the characteristics of the occupant of the vehicle are obtained by a vehicle-to-infrastructure (V2I) capable roadside unit.

21. The system of claim 20, wherein the V2I capable roadside unit obtains the operating characteristics of the vehicle and the characteristics of the occupant of the vehicle from at least one of an electronic control unit of the vehicle, one or more sensors implemented in or associated with the vehicle, and a database in which aspects of the characteristics of the occupant of the vehicle are stored.

22. The system of claim 18, wherein the controller controlling operation of the digital billboard is at least one of remotely located from the digital billboard and co-located with the digital billboard.

23. The system of claim 18, wherein the vehicle comprises an autonomous vehicle, and wherein the controller controlling operation of the digital billboard initiates transmission of a speed override command to the autonomous vehicle to reduce a current speed of travel of the vehicle to a speed allowing the targeted media presented on the digital billboard to be viewed by the occupant of the vehicle.

24. The system of claim 18, wherein the threshold speed is determined based on a distance of the vehicle from the digital billboard.

* * * * *